United States Patent

[11] 3,623,699

| [72] | Inventors | Stephen Matousek;<br>Ulrich H. Koch, both of Moraga, Calif. |
|---|---|---|
| [21] | Appl. No. | 822,678 |
| [22] | Filed | May 7, 1969 |
| [45] | Patented | Nov. 30, 1971 |
| [73] | Assignee | Whitey Research Tool Co.<br>Emeryville, Calif. |

[54] VALVE WITH RAISED SEALING SEAT ABUTTING A SOFT ANNULAR RING AND STEM
10 Claims, 5 Drawing Figs.

[52] U.S. Cl. .................................. 251/330, 251/333, 251/368
[51] Int. Cl. .................................. F16k 25/00
[50] Field of Search .................................. 251/330, 333, 332, 122, 368

[56] References Cited
UNITED STATES PATENTS

| 1,004,320 | 9/1911 | Webster | 251/333 X |
| 1,818,856 | 8/1931 | Langdon | 251/333 X |
| 925,729 | 6/1909 | Speer | 251/333 |
| 1,760,391 | 5/1930 | Williams et al. | 251/122 |
| 2,290,177 | 7/1942 | Grant | 251/333 |
| 2,678,187 | 5/1954 | Peters | 251/332 UX |
| 2,695,032 | 11/1954 | Kmiecik | 251/333 X |
| 3,084,903 | 4/1963 | Parks | 251/332 X |
| 3,269,698 | 8/1966 | Koch | 251/330 X |

FOREIGN PATENTS

| 597,877 | 5/1934 | Germany | 251/332 |
| 1,313 | 1/1888 | Great Britain | 251/333 |

OTHER REFERENCES

"Plastics Industry" Volume 9, Number 6, June, 1951, p. 13, [251/368]
"Modern Plastics," October, 1968, pp. 168 & 170

Primary Examiner—M. Cary Nelson
Assistant Examiner—R B. Rothman
Attorney—Fay, Sharpe and Mulholland ABSTRACT: This invention concerns a valve having a soft annular ring embedded in the inner end of the valve stem intermittently to seal against a raised seat in the fluid flow passage of the valve. The valve body includes certain conventional structure such as a flow passage terminating in an inlet and an outlet, bonnet means having a stem projecting therethrough into the passage and a handle on the outer end of the stem. The annular ring is made thicker than the height of the raised valve seat to prevent severing of the ring.

PATENTED NOV 30 1971 3,623,699
FIG. 1
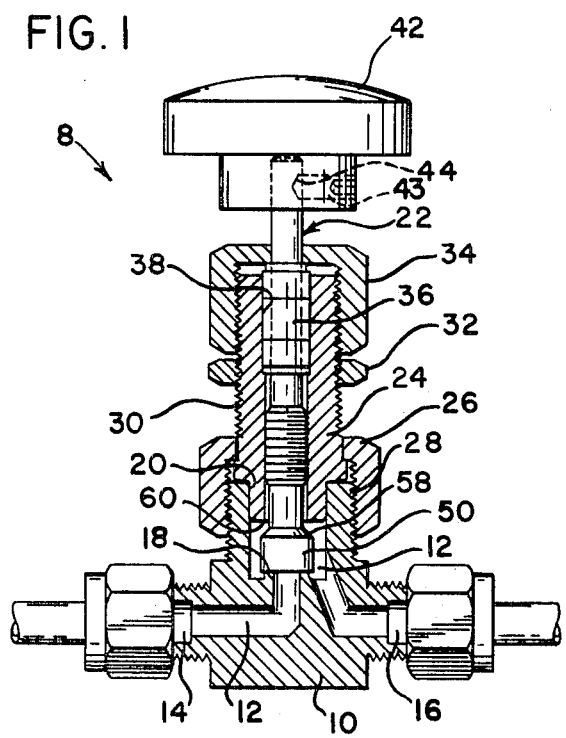
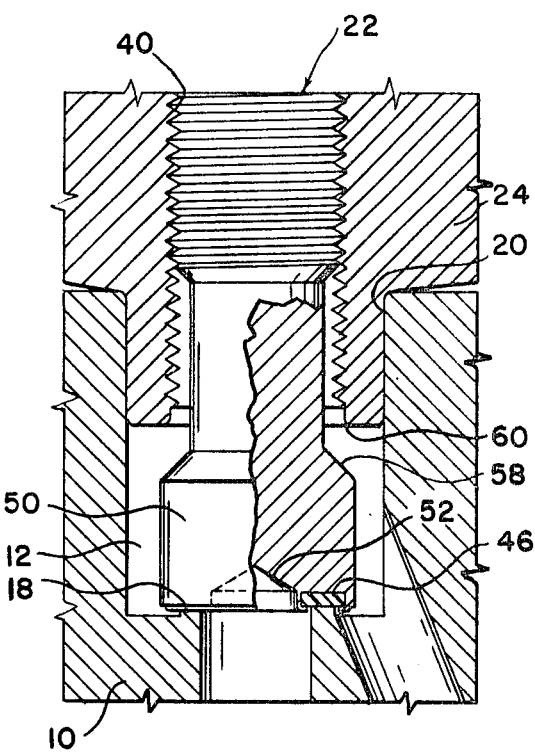
FIG. 2
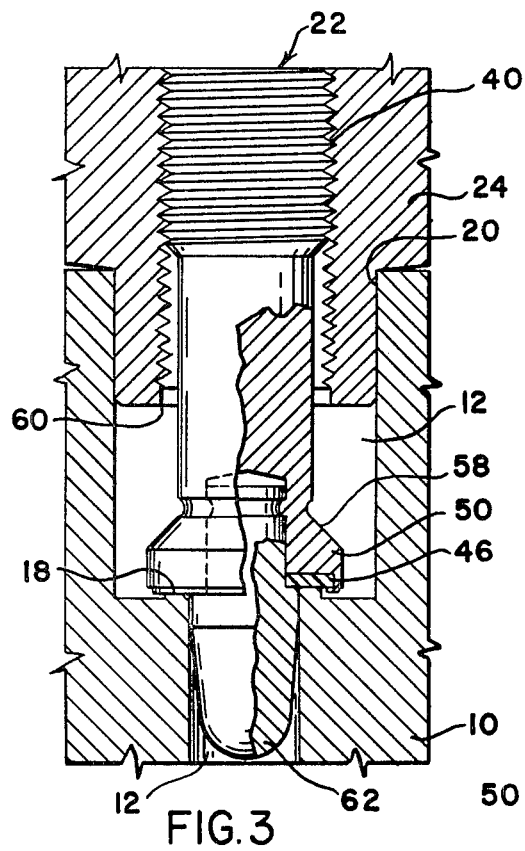
FIG. 3
FIG. 4
FIG. 5
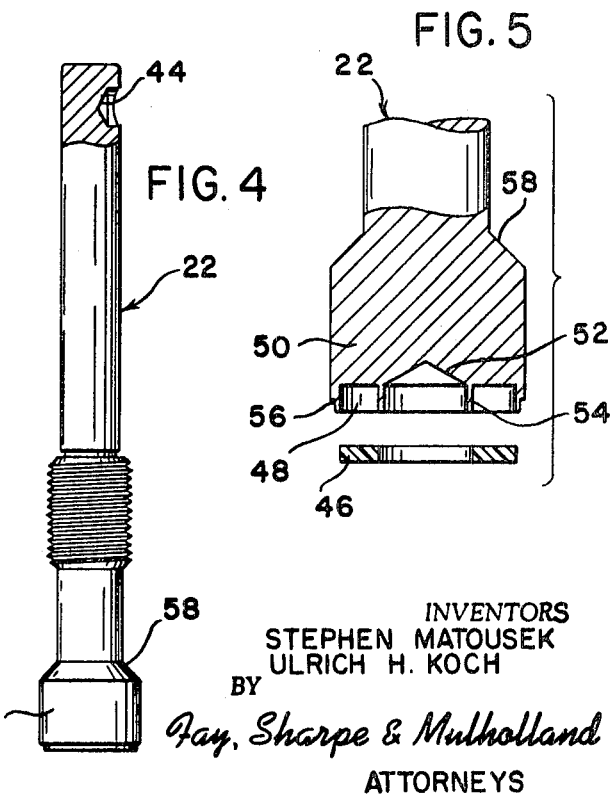
INVENTORS
STEPHEN MATOUSEK
ULRICH H. KOCH
BY Fay, Sharpe & Mulholland
ATTORNEYS

VALVE WITH RAISED SEALING SEAT ABUTTING A SOFT ANNULAR RING AND STEM

BACKGROUND OF THE INVENTION

The use of soft rings in the end of a valve stem to engage a sealing seat in a fluid valve is not unusual. However, it is quite difficult to utilize such an arrangement successfully at high pressures.

The basic problem in this respect results from the fact that when such a valve is closed against highly pressurized fluids, there will be a substantial pressure drop of, for example, up to perhaps 5,000 p.s.i. across the surface of the soft ring. The fluid on the pressure side of the fluid line will tend to permeate the ring if the ring is porous or if the ring is nonporous, the fluid will tend to deform the ring and migrate behind it. The result is that when the pressure across the ring is suddenly relieved, as by opening the valve, the pressurized fluid which has been built up behind the ring generates unbalanced forces which tend to blow the ring out of its recess.

It has been found that certain dimensional limitations, the hardness of some materials and various shear flow characteristics are critical in the failure of the ring in the end of the stem.

BRIEF DESCRIPTION OF THE INVENTION

This invention involves a coupling for a fluid flow line and includes the customary valve body with a fluid flow passage therethrough establishing communication between an inlet and an outlet. A stem projects into the passage through a lateral opening in the body and a bonnet envelops the stem with suitable sealing means placed between the bonnet and the stem to prevent escape of fluid. The innermost portion of the stem includes a face with an annular ring of soft material is so implanted in the face of the valve stem, and the annular raised portion of the seat is so dimensioned, that the raised seat contacts slightly less than the full exposed face of the ring and the raised seat has a height smaller in magnitude than the thickness of the embedded ring, measured along the axis of the stem.

It is an object of this invention to provide a valve having a valve stem therein with a soft annular ring embedded in the stem for abutting a raised sealing seat in the flow passage of the valve; and in which the propensity of the ring to be displaced from the stem under the influence of rapid pressure changes is markedly reduced relative to prior art valves.

Another object of this invention is to provide a valve stem with a soft annular ring in its sealing face, wherein the ring is less subject to deformation and less permeable to pressurized fluids than in the past.

Still another object of this invention is to provide a method for assembling an annular ring of superior physical characteristics within a recess in the end of a valve stem.

DESCRIPTION OF THE DRAWINGS

FIG. 1 is an elevational view, partially in section, of a valve incorporating the principles of this invention;

FIG. 2 is an enlarged elevational view, partially in section, of the seating area in the flow passage of the valve;

FIG. 3 is an elevational view, partially in section, of a modification of the enlarged valve stem end;

FIG. 4 is an elevational view of the valve stem; and

FIG. 5 is an elevational view, partially in section, of the end of the stem prior to insertion of the soft sealing ring.

PREFERRED EMBODIMENT

Illustrated in FIG. 1 is a valve 8 which includes a valve body 10 having a fluid flow passage 12 extending therethrough from an inlet 14 to an outlet 16. A raised annular seat 18 is disposed within and circumscribes the fluid flow passage 12. A valve stem 22 is introduced into the fluid passageway 12 through opening 20 formed in the valve body 10. The valve stem is supported by a bonnet 24 which is mounted on the valve body by a union nut 26 threaded at 28 to the valve body. The bonnet has threads 30 along its exterior surface which carry a panel mounting nut 32, for use in the event it is desired to affix the valve to a panel board, bulkhead or the like.

Also carried on threads 30 is a locking nut 34 which limits the movement of the valve stem in its outward direction and retains the packing 36 in the bore 38 of the bonnet. The lower ends of the bonnet 24 and stem 22 are complimentarily threaded at 40 and this threaded connection serves as a means to regulate the position of the sealing face of the valve stem relative to the raised valve seat 18. A suitable handle 42 for manual operation is attached to the outer end of the valve stem by a setscrew 43 which threads into an aperture 44 in the stem.

In FIG. 5 is illustrated the lower end of the valve stem, in section, before the soft or semirigid annular-sealing ring 46 is inserted. The annular recess 48 is formed in the face of the enlarged head 50 disposed on the inner end of the valve stem. The recess 48 and the blind bore 52 serve to form two coaxial annular rims 54 and 56, here characterized respectively as the inner and outer rims.

Referring now to FIG. 2, the lower end of the valve stem flares out to the enlarged head 50 and the flare forms a shoulder 58 between the enlarged head and the smaller diameter adjoining portion of the stem. The shoulder 58 is larger in diameter than the bore 38 through the bonnet 24, and when the valve is opened to its fullest extent, the shoulder 58 will sealingly engage an abutment 60 formed by the bore and the lower end face of the bonnet 24. The shoulder 58 and the abutment 60 acting together provide a back seat to limit, at certain times, fluid flow into the threaded area. The primary purpose of the back seat is, upon some failure of the packing means 36, to prevent excessive leakage through threads 40 until repairs can be made. Further, the back seat will, depending on the valve setting, serve to reduce contamination by thread lubricant of fluids flowing through the valve by minimizing exposure of the threads to such fluids.

In FIG. 3, a modification of the lower end of the valve stem is shown to adopt the valve for use in those applications where regulation of flow is desired. In the illustrated form, the enlargement 50 is shown as reduced somewhat in axial length to provide clearance for the accommodation of an elongated nose or regulating tip 62 affixed to the inner end of the stem and having a slightly tapered terminus. The tip projects into the passage 12, and ordinarily defines a clearance of 0.001 or 0.002 inch with passage 12 to prevent sticking and to eliminate large pressure surges on opening. It will be readily apparent from inspection that the quantity of flow permitted through the valve will vary with the degree of insertion of regulating tip into passage 12.

In the development of the present invention, it has been found that there are a number of design characteristics which seem to exert considerable influence on valve performance. Quite important, for example, is the character, both structural and material, of the soft annular ring. When the ring is fabricated from, for example, polytetrafluoroethylene or monochlorotrifluoroethylene (which are materials generally well adapted for use in the valve) the shear flow properties of these materials under pressure tend to allow the raised valve seat to cut through the ring to the bottom of recess 48. This is obviously detrimental and contributes to failure of the valve.

Further, if the ring is too thin, its flexibility becomes too great to resist "blow out." Therefore the thickness of the annular ring measured axially along the valve stem should be of sufficient magnitude to prevent the ring from being severed and further to insure against an unacceptable level of ring flexibility. It is clear from experiments that the greater the thickness of the ring 46 in relation to the height of the raised valve seat 18, the more effective is the valve-seating over a period of time. However, it is also true that the thicker the ring, the deeper the recess required to accommodate it, and the deeper the recess, the more complex the machining operation. Therefore, it is considered that the thinnest ring which will otherwise function properly is the most desirable.

It has been determined by experimentation that the valve stem will normally perform satisfactorily so long as the height of the raised valve seat does not exceed the thickness of the soft annular ring. In view of tolerance limitations and machining difficulty at greater depths, it has been determined that the most convenient height for the raised seat 18 in smaller orifice valves is approximately 0.0312 inch. Accordingly, the thickness of ring 46 should ordinarily exceed that value somewhat.

Various materials have been used in forming the ring 46 and extensive studies have been made to determine which of these exhibit the best physical properties for the present application. A large number of materials are generally satisfactory if they are properly handled. Among these are rubber, tetrafluoroethylene, monochlorotrifluoroethylene and certain soft metallic substances such as copper and lead. The term "soft metallic substances" as hereinafter used is intended to include soft metals, per se, as well as soft alloys. Where rings are fabricated from rubber, the rubber should have a durometer hardness of at least 90. Where the fabrication material is monochlorotrifluoroethylene, unplasticized, the specific gravity should ordinarily be at least 2.15.

As is known, the majority of Teflon materials on the market are of a porous nature and due to the high pressures in certain valve applications, this porosity allows penetration through the ring of the fluids from the high-pressure side of the valve. This results in the formation of a high-pressure pocket behind the ring. Upon opening of the valve, the pressurized fluid in the pocket generates forces behind the ring 46 which, because of the quick reduction in pressure at its outer face, results in forcible ejection of the ring from its recess in the stem tip. It is accordingly necessary to reduce the porosity of Teflon used to produce rings which are intended for use in high-pressure valves. Experiments indicate that when Teflon is made more dense, to at least a specific gravity of about 2.15, then the Teflon is sufficiently nonporous to function satisfactorily.

Another important factor is the nature of the concentric rims 54 and 56 which must be deformed down onto the ring 46. It has been discovered that if too thin, measured radially, rims tend to split when spanked down upon the marginal edges of its ring. On the other hand, the rims must be strong enough to hold the ring 46 and ductile enough to be deformed from the shape of FIG. 5 to the shape of FIG. 2 without splitting. Satisfactory performance has been experienced in many applications using a rim thickness on the order of from about 0.025 to about 0.030 inch.

Manifestly, it is necessary that a clearance be maintained between the crimped over rims 54 and 56 and the edges of the raised seat 18 to avoid interference between the rims and the seat on closing of the valve. At the same time however, it is desirable that the seat cover nearly all of the ring when the valve is closed so that the ring is supported as fully as possible on all sides when under the influence of high pressure. This helps to shield the ring from the substantial forces generated at high pressures thus to reduce deformation and cold flow and preserve the integrity of the seal. In some applications, a clearance of about 0.007 inch between the edge of the rims and the corresponding edges of the raised seat has been found appropriate.

The proper method for assembling the soft ring 46 in the face of the stem 22 must be rather precisely followed to insure a serviceable stem. The first step is to form two concentric rims 54 and 56 on the sealing face of the stem. This may be accomplished (1) by drilling or otherwise forming the central recess 52 and then machining the annular recess 48, (2) reversing the sequence or (3) performing the drilling and machining operations simultaneously. Any of these methods may be used so long as proper ring-thickness is obtained, and so long as the rims are of generally uniform strength. Further, care must be exercised to prevent accidental deformation of the rims. The recess 48 should be of proper depth to accommodate the soft ring 46 and to allow portions of the rims to be deformed over the ring. By way of illustration, with a raised seat of 0.0312 inch, a recess depth of about 0.093 inch and a ring-thickness of about 0.062 inch has been found satisfactory.

After positioning of the ring in the recess, the rims are spun-over to an angle of approximately 45°. This spin-over deformation of the rims causes both rims to overlie the margins of ring 46. The final step is to spank or crimp the deformed rims down into engagement with the soft ring. This should be done with a sudden thrust by a flat plate or the like. This last operation usually causes the bent over rims to embed in the soft ring and a certain amount of cold flow of the ring results. It is important to note that the rims should be deformed against the edges of the ring 48 with sufficient tightness to establish a high integrity seal around the ring. Otherwise, pressurized fluid will migrate to a position behind the ring with the unfortunate consequences previously described.

For ease of description, the principles of the invention have been set forth in connection with but two illustrated embodiments. It is not intended that the illustrated embodiments nor the terminology employed in describing them be limiting inasmuch as variations in these may be made without departing from the spirit of the invention. Rather, it is intended that this invention be restricted only by the scope of the appended claims.

1. In combination, a valve body with passage means between an inlet and an outlet,
   stem means projecting into said body for sealing against an annular seat within said passage,
   an annular recess in the inner end of said stem means containing an annular ring composed of a material selected from the group consisting of polytetrafluoroethylene of a specific gravity not less than 2.15, unplasticized polymonochlorotrifluoroethylene, soft metals and rubber having a durometer hardness of at least 90,
   said ring substantially completely filling the recess,
   the surface of said ring facing said seat being partially covered by concentric rims holding the edges of said ring in continuous compression and in substantially fluidtight sealing engagement within the recess,
   the seat comprising a raised surface for sealing against said ring,
   said surface being of a width to contact a major portion of the exposed surface of said ring and without contacting either rim,
   with the seat and ring in sealing engagement the interaction of the holding pressure of the rims and the substantially completely filling of the recess by said ring combining to maintain said substantially fluidtight sealing engagement at the rims up to fluid pressures of 5,000 p.s.i.

2. The combination of claim 1 wherein the stem includes an enlargement, the enlarged portion nearest the handle including a shoulder sloping radially outward from the stem axis and toward the seat, the surface of said enlargement radially outward of said axis between said shoulder and the inner end of the stem defining the surface of a cylinder with its axis substantially coextensive with the stem axis; means forming a seal between the stem and body including a bonnet having an inwardly facing annular abutment for engaging said shoulder to provide a back seat.

3. The combination of claim 2 wherein the linear dimension of said ring is greater than the linear dimension of said raised seat, both measured parallel with said axis.

4. The combination of claim 3 wherein said linear dimension of said raised seat is at least about 0.0312 inch.

5. The combination of claim 1 wherein the radial thickness of said rims is not greater than about 0.03 inch.

6. In combination, a valve body with passage means between an inlet and an outlet,
   stem means projecting into said body for sealing against an annular seat within said passage,
   an annular recess in the inner end of said stem means containing an annular ring composed of a material selected from the group consisting of polytetrafluoroethylene of a specific gravity not less than 2.15, unplasticized polymonochlorotrifluoroethylene, soft metals and rubber having a durometer hardness of at least 90, a nose portion projecting from the inner end of said stem through an opening in the ring, said ring substantially completely filling the recess between said nose portion and a rim at the periphery of said recess, the surface of said ring facing said seat being partially covered by said rim and a shoulder on said nose portion, said rim and shoulder holding the edges of said ring in sealing engagement within the recess, the seat comprising a raised flat surface for sealing against said ring, said flat surface being of a width to contact substantially all of the exposed surface being of a width to contact substantially all of the exposed surface of said ring and without contacting the rim or the nose portion, with the seat and ring in sealing engagement the interaction of the holding pressure of the rim and the shoulder and the substantially completely filling of the recess by the ring combining to maintain said substantially fluidtight sealing engagement at the rim and shoulder up to fluid pressures of 5,000 p.s.i.

7. The combination of claim 6 wherein the linear dimension of said ring is greater than the linear dimension of said raised seat, both measured parallel with said axis.

8. The combination of claim 7 wherein said linear dimension of said raised seat is at least about 0.0312 inch.

9. The combination of claim 6 wherein the stem includes an enlargement, the enlarged portion nearest the handle including a shoulder sloping radially outward from the stem axis and toward the seat, the surface of said enlargement radially outward of said axis between said shoulder and the inner end of the stem defining the surface of a cylinder with its axis substantially coextensive with the stem axis; means forming a seal between the stem and body including a bonnet having an inwardly facing annular abutment for engaging said shoulder to provide a back seat.

10. The combination of claim 6 wherein the radial thickness of said rim is not substantially greater than about 0.03 inch.

* * * * *